though the aforedescribed process is applicable to the recovery of monoalkylbenzenes in general, it will be described hereinafter with reference to the production of ethylbenzene from ethylene-containing gases.

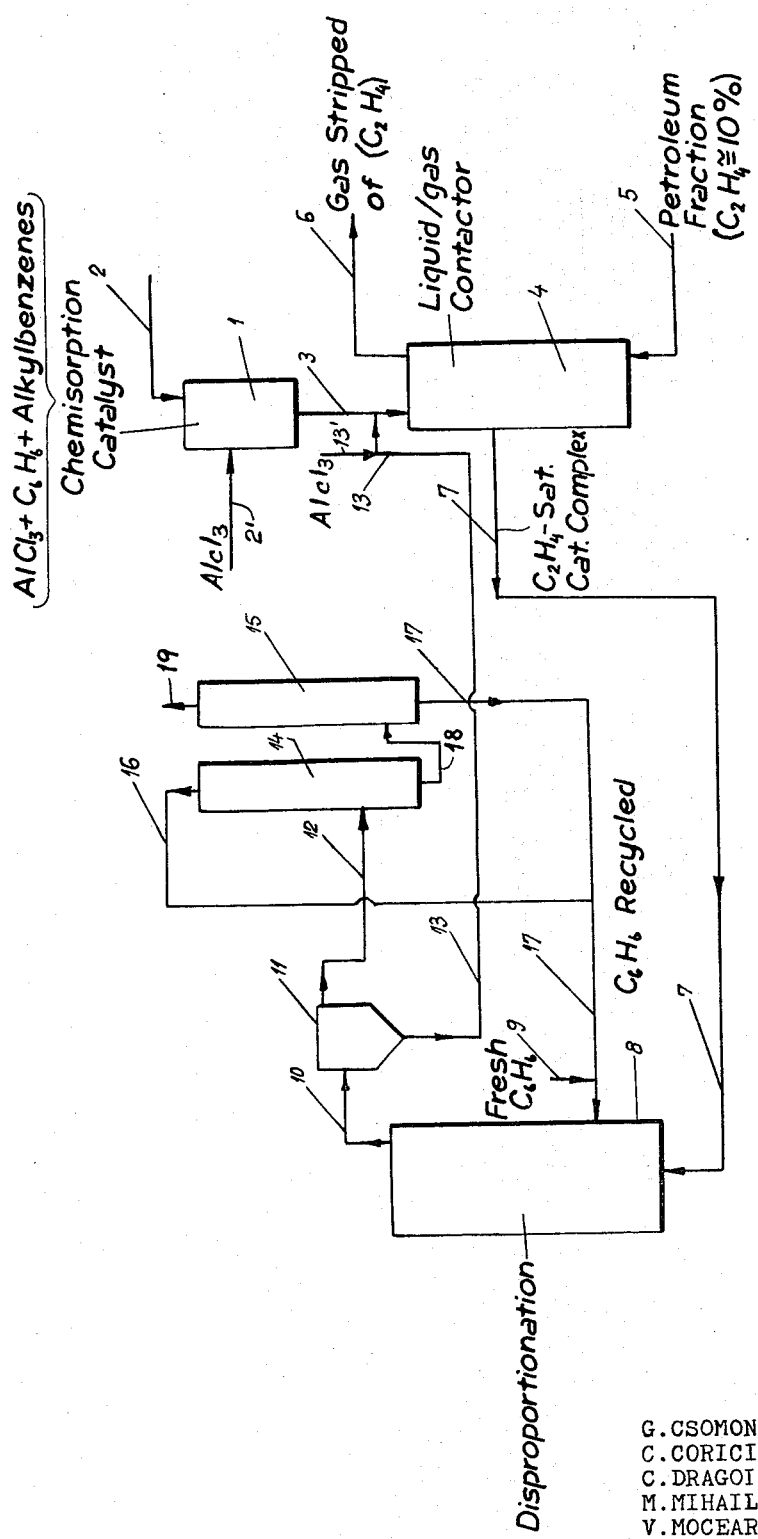

United States Patent Office
3,536,772
Patented Oct. 27, 1970

3,536,772
PROCESS FOR THE PRODUCTION OF
MONOALKYLBENZENES
Georgeta Csomontanyi and Cornelia Coriciuc, Ploesti, Constantin Dragoi, Bucharest, Mihai Mihailescu, Ploesti, Vladimir Mocearov, Bucharest, Alexandru Panovici, Ploesti, and Mihai Stanciulescu, Bucharest, Rumania, assignors to Ministerul Industriei Chimice, Bucharest, Rumania, an instrumentality of the Government of Rumania
Filed Feb. 29, 1968, Ser. No. 709,287
Claims priority, application Rumania, Mar. 18, 1967, 53,374
Int. Cl. C07c 3/00, 3/50, 3/58
U.S. Cl. 260—672
10 Claims

ABSTRACT OF THE DISCLOSURE

A process for the production of monoalkylbenzenes (especially ethylbenzene) wherein a catalyst complex of 35 to 40% by weight aluminum chloride, and benzene and alkylbenzenes in a molar ratio of alkyl groups to benzene rings of 0.3 to 0.5 is used to chemisorb a dilute lower olefin from a petroleum refinery gas fraction containing 5 to 95% by volume of the olefin (especially ethylene) at a temperature of 40 to 100° C. and a pressure of 1 to 30 atmospheres; the resulting chemisorption composition is subjected to disproportionation in the presence of benzene to yield the monoalkylbenzene and a residual complex having a low alkylation organic phase and aluminum chloride as well as benzene and alkylbenzenes which are recycled to the disproportionation stage. The disproportionation being carried out at 60° C. to 100° C. and at approximately atmospheric pressure. The residual complex is combined with aluminum chloride up to the limit of its solubility in the product produced by disproportionation and is recycled for further chemisorption of olefin.

Our present invention relates to a process for the production of monoalkylbenzenes from an olefin-containing raw material such as a petroleum-refinery gas fraction and, more particularly, to the formation of monoethylbenzene using ethylene derived from such a gas fraction and present therein to a relatively small extent (i.e. in a dilute state).

The literature discloses processes for alkylating benzene with concentrated ethylene in the presence of alkylation catalysts such as aluminum chloride (AlCl₃), sulfuric acid (H₂SO₄), phosphoric acid (H₃PO₄), hydrogen fluoride (HF) and boron trifluoride (BF₃). It is also known to alkylate benzene using as the alkylating agent a gaseous fraction containing relatively low concentrations of ethylene and resulting from thermal or catalytic cracking of petroleum fractions, especially gasoline fractions. A significant disadvantage of systems for alkylating benzene with ethylene in the presence of any of the aforementioned alkylation catalysts is the use of concentrated ethylene as the alkylating agent, the obtention of ethylene in this highly concentrated state requiring special apparatus and procedures which render such alkylation economically unfeasible and difficult to carry out. Furthermore, conventional alkylation techniques do not permit, to any great extent, recycling of polyalkylbenzenes. The alkylation of benzene with dilute olefins as mentioned earlier is a catalytic process carried out in a heterogeneous system under high temperature and pressure and requires catalysts activated by hydrogen fluoride, phosphoric acid, etc., and must be effected in the presence of a solid catalyst (e.g. one of the group mentioned immediately above), with the catalyst being deposited upon or in a solid catalyst support. The products of these methods have hitherto been relatively impure monoalkylbenzenes and the techniques themselves are fraught with disadvantages as enumerated above.

It is, therefore, the principal object of the present invention to provide an improved economical system for the formation of monoalkylbenzenes wherein the aforementioned disadvantages can be obviated and a product having a high degree of purity can be obtained.

Still another object of this invention is to provide a process for the formation of monoalkylbenzenes, especially ethylbenzene, which can strip substantially all of the ethylene from a refinery-gas fraction in which it is contained.

We have now discovered that it is possible to obtain high-purity monoalkylbenzene, especially ethylbenzene, using as an alkylating medium a petroleum-refinery gas which may have as low as 5% by volume and as much as 95% by volume ethylene or a similar lower olefin (mono-olefins having a linear or branched carbon chain of 2 to 8 carbon atoms) and yet strip most of the olefin from the refinery-gas fraction by contacting the latter with a chemisorption catalyst complex in which aluminum chloride is combined with aromatic hydrocarbons, especially benzene and alkylbenzenes.

The resulting chemisorption system, which is formed by intimately contacting the olefin-containing gas fraction with the complex to saturate the latter with the olefin, is subjected to disproportionation in the presence of benzene to reform the polyalkyl benzenes produced in the complex during the chemisorption stage. The chemisorption step is carried out preferably at a temperature of 40° C. to 100° C. at a pressure of 1 to 30 atmospheres (preferably 60° C. to 80° C. at 1 to 10 atmospheres) using a complex consisting essentially of 35 to 40% by weight aluminum chloride, the balance being an aromatic component containing benzene and alkylbenzene with a molar ratio of alkyl groups to benzene rings of substantially 1.5 to 2.0. The disproportionation step is carried out at 60° C. to 100° C., preferably at substantially atmospheric pressure. After the disproportionation step the product is found to contain a residual complex of aluminum chloride and organic compounds of low alkylation which may be combined, after separating the aromatic component from the complex, with sufficient aluminum chloride to bring its level in the complex substantially to the limit of aluminum chloride solubility in the alkylated product. The aromatic component is separated to recover the desired monoakylbenzene while the remaining benzene and polyalkylbenzene are recycled to the disproportionation step.

The aforedescribed process has been found to be highly economical and yields a gas (from which ethylene and other olefins have been substantially completely stripped) which can be used effectively in organic synthesis or for the hydrogenation of unsaturated compounds. The process is relatively inexpensive and allows recycling of practically all substances aside from the desired product. In addition, the high temperatures and pressure previously required need not be used here.

The above and other objects, features and advantages of the present invention will become more readily apparent from the following description, reference being made to the accompanying drawing, the sole figure of which is a flow diagram representing the principles of the present invention.

In the drawing, we show a plant for the production of alkylbenzne which comprises a catalyst-preparation vessel 1 in which aluminum chloride (AlCl₃) from line 2' is combined with aromatic hydrocarbons (i.e. benzene and one or more alkylbenzenes) delivered by a conduit 2 in a molar ratio of alkyl groups to benzene rings of 0.3 to 0.5. From the vessel 1, the chemisorption catalyst complex is fed via a line 3 into a liquid/gas contacting apparatus or extraction tower 4 in which the descending complex is passed countercurrent to the rising stream of gas (i.e. a petroleum fraction containing 10% by volume of an olefin, e.g. ethylene). The temperature in the contactor 4 can be maintained between 40° C. and 100° C. at a pressure of 1 to 30 atmospheres. The petroleum-refinery fraction is supplied via the line 5. At the head of the tower 4, the gas stripped of ethylene is led at 6 away from the system for other use (e.g. for hydrogenation of olefins).

The saturated catalytic complex is led from the tower 4 as represented by the line 7 and can be considered to contain, in addition to aromatic hydrocarbons with a molar ratio of alkyl groups to benzene rings of 1.5 to 2.0, residual aluminum chloride complexed with nonalkylated organic compounds or organic compounds of low alkylation. The aromatic component, however, consists predominantly of polyalkybenzenes. From line 7, the saturated complex is passed into the disproportionation apparatus 8 where, at a pressure of about 1 atmosphere and at a temperature between 60° and 80° C., it is treated with fresh benzene (supplied at 9) and recycled benzene (supplied at 17) to yield a product mixture consisting predominantly of benzene, monoalkylbenzene, dialkylbenzene and polyalkylbenzene (in addition to the residual complex).

The disproportionation mixture is fed at 10 into a decanter 11 in which the residual complex sediments from the aromatic components and is returned via line 13 to the contactor or saturating apparatus 4 after rejuvenation with additional aluminum chloride (from line 13') which is combined therewith to the limit of the solubility of aluminum chloride in the alkylated product led at 12 from the decanter to the fractionating columns 14 and 15. In the fractionating column 14, the nonreacted benzene is recovered and led via line 16 to the line 17 for return to the disproportionation tower 8. The remainder of the aromatic component is delivered to fractionating column 15 via line 18 and is there broken down into the monoalkylbenzene (recovered at 19) and the dialkyl and polyalkylbenzenes which are returned at 17 to the disproportionation column 8.

EXAMPLE I

Using the apparatus shown in the drawing, a catalytic complex is prepared in vessel 1 of 35 to 40% by weight aluminum chloride and the balance benzene and ethylbenzene such that the molar ratio of alkyl groups to benzene rings is between 0.3 and 0.5. This catalytic complex is fed via conduit 3 into the contactor 4 which is maintained at a temperature of 60° to 80° C. and a pressure of 1 to 10 atmospheres. A petroleum-refinery gas fraction containing about 10% by volume ethylene along with hydrogen and small quantities of sulphur-containing compounds, oxygen-containing compounds and nitrogen-containing compounds is supplied from below via line 5. The treatment time is sufficient to substantially saturate the catalytic complex with ethylene and to remove substantially all of the ethylene but about 1% thereof. The gas, substantially free from olefin, is led at 6 to a hydrogenation apparatus for upgrading olefins in the petroleum-refining process. The saturated catalytic complex derived from the contactor via line 7 has an organic phase consisting essentially of aromatic hydrocarbons with a molar ratio of alkyl groups to benzene rings equal to 1.5 to 2.0. This saturated complex is delivered to a disproportionation apparatus in a 1:1 by weight ratio with fresh benzene (lines 9 and 17), the disproportionation apparatus being maintained at a temperature of 60° to 80° C. and a pressure of about 1 atmosphere. The alkylated product obtained at 10 contains 55 to 60% by weight benzene, 35 to 38% by weight ethylbenzene, 3 to 5% by weight diethylbenzene and 0.4 to 0.6% by weight residual polyalkylbenzenes. After recovery of the residual complex it is recycled to the contactor (line 13) while recovered benzene, polyalkylbenzenes and, if desired, dialkylbenzene are recycled to the disproportionation apparatus 8.

EXAMPLE II

The method of Example I is employed except that gases resulting from the cracking of gasoline are used containing, in various tests, 20 to 95% by volume ethylene. The results showed that the process can be carried out effectively with relatively poor refinery gases containing 5 to 30% by volume ethylene in admixture with hydrogen and saturated hydrocarbons. In all cases it was possible to strip ethylene from the gas to a point that not more than 1% by volume remained in the purified gas. A conversion of up to 90% by volume of the ethylene to ethylbenzenes was obtainable.

The invention described and illustrated is believed to admit of many modifications within the ability of persons skilled in the art, all such modifications being considered within the spirit and scope of the appended claims.

We claim:

1. A process for the production of monoalkylbenzenes comprising the steps of:
   (a) contacting a catalyst complex, consisting essentially of aluminum chloride and an aromatic hydrocarbon, with a petroleum-refinery gas fraction containing 5 to 95% by volume of a lower olefin for a period and at a temperature sufficient to effect chemisorption of said olefin in said complex, thereby forming at least one polyalkylbenzene in the complex;
   (b) disproportionating with benzene the polyalkylbenzene in the complex of step (a) to form an alkylated product with an aromatic component consisting essentially of a monoalkylbenzene, benzene and residual polyalkylbenzene and a residual complex of organic compounds of low alkylation with aluminum chloride;
   (c) separating said aromatic component from said residual complex after disproportionation in step (b);
   (d) separating the aromatic component obtained in step (c) to recover therefrom said monoalkylbenzene and the benzene and residual polyalkylbenzene; and
   (e) combining the residual complex of step (c) with aluminum chloride substantially up to its solubility in said product to form an additional quantity of the complex for recycling to step (a) for contact with additional quantities of olefin-containing fractions of refinery gas.

2. The process defined in claim 1 wherein the complex used to contact the refinery gas fraction in step (a) consists of essentially 35 to 40% by weight of aluminum chloride and an organic phase constituting the balance of said complex and containing benzene and alkylbenzenes such that the molar ratio of alkyl groups to benzene rings ranges from about 0.3 to 0.5.

3. The process defined in claim 2 wherein said benzene recovered from said aromatic component in step (d) is recycled to step (b) for use in disproportionating additional quantities of complex containing chemisorbed olefin.

4. The process defined in claim 1 wherein the product formed in step (b) consists essentially of aluminum chloride and an organic phase constituted of benzene and alkylbenzenes with a molar ratio of alkyl groups to benzene rings of substantially 1.5 to 2.0.

5. The process defined in claim 1 wherein said olefin is ethylene.

6. The process defined in claim 5 wherein the complex is contacted in step (a) with the refinery-gas fraction at a temperature of 40° to 100° C. and a pressure of 1 to 30 atmospheres to effect chemisorption of the olefin in the complex.

7. The process defined in claim 6 wherein said temperature for chemisorption of the olefin in the complex in step (a) is maintained between 60° and 80° C. at a pressure of 1 to 10 atmospheres.

8. The process defined in claim 6 wherein the disproportionation of the complex in step (b) is carried out at a temperature of 60° to 100° C.

9. The process defined in claim 8 wherein the disproportionation in step (b) is carried out at a temperature of about 80° C. and at approximately atmospheric pressure.

10. The process defined in claim 9 wherein the refinery gas fraction contains about 10% by volume ethylene.

References Cited

UNITED STATES PATENTS

| | | | |
|---|---|---|---|
| 2,360,358 | 10/1944 | Mattox | 260—671 |
| 2,373,062 | 4/1945 | Stahly | 260—671 |
| 2,389,445 | 11/1945 | Mattox et al. | 260—671 |
| 2,396,682 | 3/1946 | Carmody | 260—671 |
| 2,403,124 | 7/1946 | Rosenquist | 260—671 |

DELBERT E. GANTZ, Primary Examiner

G. E. SCHMITKONS, Assistant Examiner

U.S. Cl. X.R.

260—671